United States Patent Office 3,576,615
Patented Apr. 27, 1971

3,576,615
FERTILIZER COMPOSITION AND PROCESS
William P. Banks and Richard L. Every, Ponca City, Okla., assignors to Continental Oil Company, Ponca City, Okla.
No Drawing. Filed Nov. 15, 1967, Ser. No. 683,122
Int. Cl. C05b 7/00
U.S. Cl. 71—51                                           7 Claims

ABSTRACT OF THE DISCLOSURE

Potassium chloride can be stored and transported in contact with carbon steel by dissolving or forming a slurry in ammonia; minor amounts of water can be tolerated without substantially increasing corrosivity. In a second embodiment, the composition can also include elemental sulfur.

---

This invention relates to novel compositions of low corrosivity, and to methods for their transport. In one aspect, the invention relates to a composition comprising ammonia with at most a minor amount of water therein containing also potassium chloride either in solution or in excess sufficient to form a slurry. In another aspect, the composition can also contain elemental sulfur. In yet another aspect, the invention relates to transport of such compositions in a carbon steel pipeline.

Potassium chloride is a recognized fertilizer component, but because it is a solid, the cost of handling and transporting it can become a material factor in the cost of a fertilizer composition. Further, conventional aqueous solutions or slurries of potassium chloride have been considered as too corrosive for transporting by pipeline, where a corrosion rate of more than about 30 m.p.y. (milli-inches per year) is generally deemed excessive.

It is accordingly an object to provide novel compositions of fertilizer components, and a method of transporting and handling same whereby carbon steel equipment can be used. Other aspects, objects, and the several advantages of this invention will become apparent upon study of this disclosure and the appended claims.

According to our invention we have discovered that potassium chloride can be put into solution or formed as a slurry with liquefied ammonia, whereby in its liquid or slurry form it is much more readily handled and transported, and we have further discovered that such solutions and slurries are non-corrosive, or at most very slightly corrosive, to carbon steel, we have discovered even more surprisingly that the system of potassium chloride in liquefied ammonia can tolerate minor amounts, say up to about 10 weight percent, of water without becoming excessively corrosive to even carbon steel. This is especially important, in that potassium chloride is often mined in the form of an aqueous slurry, and this latter discovery of our means that such aqueous slurries from a mining operation need be subjected only to a simple de-watering step, rather than an extensive and rigorous drying step, prior to being put into ammonia for storage and/or transport in carbon steel.

Lastly, it would often be advantageous to simultaneously transport more than one or even two fertilizer components, and we have discovered that substantial amounts of elemental sulfur can be incorportaed in the ammonia-potassium chloride system, with or without a small amount of water being present, and that the resulting composition still has acceptable corrosion properties. It thus becomes possible to transport as many as three important fertilizer components, viz, ammonia, potassium chloride, and sulfur, simultaneously in a carbon steel pipeline, and to store such components in low-cost carbon steel tanks.

Further understanding of the invention can be gained by study of the following specific examples. All corrosion tests were for a duration of 24 hours except where otherwise indicated, and all were run at ambient temperature of about 70–80° F. Where rate of corrosion in the presence of agitation is noted, agitation was effected by means of a clad magnetically-coupled stirring bar in the corrosion test beaker, as is known in the art. Mild steel (1020) specimens were used in all instances.

EXAMPLE 1

Potassium chloride corrosivity was compared, at various concentrations, in water and in anhydrous ammonia.

| System composition, wt. percent | | | Stirring | Corrosion rate, m.p.y. | Pitting |
|---|---|---|---|---|---|
| KCl | NH₃ | H₂O | | | |
| 15.0 | 0.0 | 85.0 | Yes | 38 | Slight. |
| 15.0 | 0.0 | 85.0 | No | 4 | Do. |
| 15.0 | 85.0 | 0.0 | No | 0 | None. |
| 25.0 | 75.0 | 0.0 | Yes | 0 | Do. |
| 50.0 | 50.0 | 0.0 | Yes | 0 | Do. |

It can be seen from the preceding data that aqueous potassium chloride can be stored under quiescent conditions in mild steel tanks without undue corrosion, but that the turbulent agitation resulting from its transport by pipeline would produce undesirable corrosion to the pipeline. It can also be seen that the ammonia-potassium chloride system is quite satisfactory for either application.

EXAMPLE 2

The effect of minor amounts of water in the ammonia-potassium chloride system was determined.

| System composition, wt. percent | | | Stirring | Corrosion rate, m.p.y. | Pitting |
|---|---|---|---|---|---|
| KCl | NH₃ | H₂O | | | |
| 15.0 | 85.0 | 0.0 | None | 0 | None. |
| 14.7 | 83.3 | 2.0 | do | 0 | Do. |
| 14.0 | 80.0 | 6.0 | do | 0 | Do. |
| 14.0 | 76.0 | 10.0 | do | 0 | Do. |
| 50.0 | 44.0 | 6.0 | Yes | 0 | Do. |

It can be seen from the preceding data that at least about 10 weight percent water can be tolerated in the system, allowing handling of the salt without the necessity of a rigorous drying step.

EXAMPLE 3

Additional experiments were made in order to determine the effect of elemental sulfur in the potassium chloride-ammonia system.

| System composition, wt. percent | | | | Stirring | Corrosion rate, m.p.y. | Pitting |
|---|---|---|---|---|---|---|
| KCl | S | NH₃ | H₂O | | | |
| 10.0 | 20.0 | 70.0 | 0.0 | None | 26 | None. |
| 10.0 | 20.0 | 68.0 | 2.0 | do | 27 | Do. |
| 10.0 | 20.0 | 68.0 | 2.0 | do | ¹ 2.4 | Do.¹ |
| 10.0 | 20.0 | 68.0 | 2.0 | Yes | ¹ 7.4 | Slight.¹ |
| 9.6 | 19.2 | 65.4 | 5.8 | None | 18 | Do. |

¹ Test duration 10 days.

From the preceding data it can be seen that the addition of sulfur to the system result in compositions which are more corrosive than in its absence, but still within the generally tolerated limit. It can also be seen, by comparing the second and third entries, that the greatest corrosion occurs initially and that the rate drops off rapidly thereafter, so that the 24-hour tests are quite conservative.

The compositions of the present invention can be easily produced by simple mixing or agitation. They can then be transported by pipeline, as desired, to a point of utility. At that time, the compositions can be used as a mixture for fertilizer or other use, or they can be separated into their various components for known diverse uses.

One suitable way of separating such compositions is by simply flashing off the ammonia, leaving behind a solid residue of potassium chloride with or without elemental sulfur. When the residue comprises a mixture of sulfur and potash, these components can be separated by e.g. leaching with a liquid which is a good solvent for one of the components and a poor solvent for the other. For instance, cold water will dissolve potash but not sulfur, while carbon disulfide will dissolve sulfur but not potash. Such separational techniques are within the skill of the art, and the preceding examples are not intended to be limiting.

As stated, the compositions of the present invention are quite useful in simultaneously transporting a plurality of fertilizer ingredients and, toward this end, the sulfur and potash can be used in the relative ratio in which they will be used for a subsequent product, obviating the need for separating the two solids. Of course, the components need not be used for fertilizer purposes, since all comprise "heavy" chemicals.

The present invention contemplates solutions of potassium chloride in ammonia, with or wthout sulfur in solution, with up to about 10 weight percent water, as well as slurries wherein excess potash and/or sulfur beyond the solubility limit is added, with up to about 10 weight percent water. The main point to be observed when slurries are used is, of course, that total solids content is maintained at a value such that solids can be suspended in the liquid conveniently.

The present invention also contemplates inclusion of additives to the compositions of the invention, such as viscosity-modifying agents and suspension aids.

Although this invention has been described with respect to particular embodiments thereof, it is not to be so limited, as changes and modifications may be made therein which are within the spirit and scope of the invention as defined by the appended claims.

What is claimed is:
1. The method of transporting potassium chloride which comprises:
 (a) forming an admixture consisting of said chloride in liquefied ammonia with at most about 10 weight percent water;
 (b) transporting the resulting admixture through a pipeline; and
 (c) subsequent to said transporting, separating at least a portion of one of the components potassium chloride and ammonia from said mixture;
at least one of the steps of forming, transporting, and separating being effected in contact with carbon steel.

2. The method of claim 1 wherein more of said chloride is admixed than will dissolve in said ammonia at ambient temperature, resulting in formation of a slurry.

3. The method of claim 1 wherein less of said chloride is admixed than will dissolve in said ammonia at ambient temperature, resulting in formation of a solution.

4. The method of claim 1 wherein there is further added to said mixture elemental sulfur.

5. A composition of low corrosivity to carbon steel consisting of potassium chloride, liquefied ammonia, and at most about 10 weight percent water based on the total composition.

6. The composition of claim 5 further including elemental sulfur.

7. The composition of claim 6 wherein sufficient of one of said chloride and said sulfur is present to form a solids-containing slurry.

References Cited
UNITED STATES PATENTS

| | | | |
|---|---|---|---|
| 2,067,931 | 1/1937 | Kniskern et al. | 71—51X |
| 3,006,755 | 10/1961 | Adams | 71—61 |
| 3,206,297 | 9/1965 | O'Conner | 71—61X |

JAMES L. DeCESARE, Primary Examiner